United States Patent [19]
Leal-Cantû et al.

[11] Patent Number: 5,447,550
[45] Date of Patent: Sep. 5, 1995

[54] METHOD AND APPARATUS FOR THE PNEUMATIC TRANSPORT OF IRON-BEARING PARTICLES

[75] Inventors: Nestor Leal-Cantû; Rogelio Trevin-Garza; Agustin Dávila-Chávez; Alberto Zazueta-Aispuro, all of Nuevo Leon, Mexico

[73] Assignee: Hylsa S.A. de C.V., Nuevo Leon, Mexico

[21] Appl. No.: 309,850

[22] Filed: Sep. 21, 1994

[51] Int. Cl.[6] ............................................. C21B 13/00
[52] U.S. Cl. ........................................ 75/379; 75/387; 266/83
[58] Field of Search ...................... 75/387, 379; 266/83

[56] References Cited

U.S. PATENT DOCUMENTS

| | | |
|---|---|---|
| 2,670,946 | 3/1954 | Royster . |
| 3,375,099 | 3/1968 | Marshall . |
| 4,032,120 | 6/1977 | Beggs . |
| 4,046,557 | 9/1977 | Beggs . |
| 4,129,289 | 12/1978 | Miyasita et al. . |
| 4,427,135 | 1/1984 | MacKay et al. . |
| 4,427,136 | 1/1984 | MacKay et al. . |
| 5,218,617 | 6/1993 | Herrera-Garcia et al. .......... 266/200 |
| 5,296,015 | 3/1994 | Becerra-Novoa et al. . |

OTHER PUBLICATIONS

*Iron and Steelmaker*, vol. 20, No. 7, Jul 1993, pp. 44–48.
*Metallurgical Plant and Technology*, vol. 15, No. 4, Aug. 1992, pp. 42–46.
*Hyl Report, The Direct Reduction Quarterly*, vol. VII, No. 1, Spring 1993, pp. 4–8.

Primary Examiner—Melvyn Andrews
Attorney, Agent, or Firm—A. Thomas S. Safford; Curtis Morris Safford

[57] ABSTRACT

Methods and systems are provided for controlling the pneumatic transport of friable particulate solid material through a transport pipe by means of a carrier gas circulating in a loop comprising the transport pipe and a carrier gas recycle conduit. A value of kinetic energy of the carrier gas is determined at a location proximal to a point of introduction of the material into the transport pipe. This value is compared with a kinetic energy set point to produce a first control signal which controls venting of carrier gas from the loop. A value of flow rate of the carrier gas in the loop is determined and compared with a comparison signal based on the first control signal to produce a second control signal. The second control signal is used to control the flow rate of the carrier gas through the carrier gas loop.

18 Claims, 2 Drawing Sheets

METHOD AND APPARATUS FOR THE PNEUMATIC TRANSPORT OF IRON-BEARING PARTICLES

FIELD OF THE INVENTION

The present invention relates to methods and apparatus for controlling the pneumatic transport of iron-bearing particles, such as Direct Reduced Iron (DRI), iron ores, or the like, wherein a direct reduction process is employed to produce an intermediate particulate solid product (also called sponge iron), which can be discharged from the reduction reactor at high temperature (above 500° C.) or at low temperature (e.g. between ambient temperature and below 500° C.) and wherein such DRI is pneumatically moved, from a first point of DRI production to a remote point of DRI utilization.

The inventive method and apparatus for controlling such a pneumatic transport system permits operation of the transport line at an advantageously low velocity without disturbing the operation of the reduction reactor while in direct open connection to said pneumatic transport system, and at the same time minimizing the venting of carrier gas from the transport system and consequently also minimizing the need of injecting additional make-up carrier gas to said transport system.

BACKGROUND OF THE INVENTION

Many applications of pneumatic conveying have been proposed in the past. All sorts of materials have been tested for their ability to be pneumatically conveyed. It has been of course natural that most pneumatic conveyors typically involve soft and unabrasive materials and especially those having low density and small particle size. Almost all research work in this field relates to such materials mostly utilizing air as a low cost carrier gas at ambient temperature.

The feasibility of pneumatically conveying DRI pellets and other large sized iron-bearing particles at low and high temperatures with compatible carrier gases has been demonstrated by applicant's assignee and the advantages that it provides in steel making have been very favorably evaluated and published in the relevant technical literature. (See, for example, *Iron and Steelmaker*, Vol. 20, No. 7, July 1993, pp. 44–48 and *Metallurgical Plant and Technology*, Vol. 15, No. 4, August 1992, pp. 42–46). There is however a need for an automatic control system for running the pneumatic conveyor while providing protection to the equipment involved.

In U.S. Pat. No. 5,296,015 to Becerra, et al. assigned to the same assignee as this application, a pneumatic transport for DRI is disclosed. Becerra et al. disclose in one of the embodiments of their invention a pneumatic transport system in combination with a direct reduction reactor and an electric arc furnace wherein the carrier gas is recycled in a closed transport loop comprising a compressor, a feeder to introduce the DRI into the pneumatic conveying pipe, a set of gas disengaging means, for example a pair of sealable bins or cyclones and means for withdrawing carrier gas from the carrier gas loop.

Applicant's assignee in continuation-in-part U.S. patent application Ser. No. 08/071,756, filed Jun. 9, 1993 (the contents of which are incorporated herein by reference) at page 12 discusses in detail the difference between dilute and dense phase pneumatic transport of DRI (briefly stated, dilute phase flow is fluidized pneumatic flow of solid particles in carrier gas while dense phase flow involves discrete plugs of particles or at least wave-like shifting dunes of particles moved by the carrier gas).

In prior art applications of pneumatic transport (see, for example, *Hyl Report, The Direct Reduction Quarterly*, Vol. VII, No. 1, Spring 1993, pp. 4–8), the material to be transported is collected in a pressurizable bin. Then, after regulated pressurization the material is discharged from the bin at a feed point to the transport pipe. A carrier gas is fed to the bin at high pressure, so that the pressure drop from the feed point to the end of the conveyor, normally discharging at atmospheric pressure, is used for pushing the solids through the conveyor. If the solids demand more pressure difference along the transport pipe, with pressure isolation of the pneumatic conveyor from the preceding and following systems, there is no problem in increasing such pressure at the bin up to a level that the solid particles are forcibly moved through the pneumatic conveyor by means of the pressure of the carrier gas.

Most of the prior art applications of pneumatic conveying of solids have been made using air at ambient temperature and without any restriction for increasing the pressure level at the beginning of the transport line. Such systems do not control kinetic energy of the carrier gas, but instead control pressure differentials along the length of the pneumatic transport pipe.

Direct reduction processes have been widely installed and are currently operated in many countries in connection with so called "mini mills" for iron and steel making.

One of the problems in utilizing a pneumatic transport system directly and openly connected to a reduction reactor is to maintain both the bottom portion of the reactor and the initial portion of the conveying line at the same pressure. This is necessary, because if these pressures are different, then the carrier gas would enter the reactor, or conversely the greater pressure of reducing gas would create a loss-flow from the reactor to the conveying line, undesirably. If carrier gas should enter the reactor, the normal reduction process therein would be disturbed especially if the carrier gas should have a different composition than the process gas in the reactor. This should mean also that in the case of a reactor directly and openly connected to the transport line, the maximum length of the transport pipe was limited to the distance along which the solids could be transported by the pressure difference between the level of pressure of the reactor and the atmospheric pressure at the discharge point of the transport pipe (unless an additional pressurizable bin and supplemental carrier gas injection were to be inserted between the reactor discharge and the transport line).

The present invention provides a method and an apparatus for controlling the pneumatic transport of hot and cold DRI particles through a transport pipe in direct open connection with the DRI reactor without disturbing the reduction process and at a velocity sufficiently low so as to minimize the degradation in particle size of a friable solid material such as DRI. This invention also permits lower operational costs, because it minimizes the amount of carrier gas which must be vented, and because the DRI particles are transported at the minimum allowable velocity so that fines generation and particle breakage are minimized.

OBJECTS AND SUMMARY OF THE INVENTION

It is an object of the present invention to provide methods and apparatus which overcome the foregoing disadvantages of prior art techniques.

It is another object of the present invention to provide methods and apparatus for the pneumatic transport of relatively large iron-bearing particles at low or high temperatures, when there is a limit in the pressure which can be set at the beginning of the transport line, and which is economically applicable to short and long distances and wherein the carrier gas is cleaned and recycled through a closed carrier gas loop.

It is a further object of the invention to provide methods and apparatus for controlling the pneumatic transport of DRI so that particle degradation and fines generation are minimized.

It is a still further object to provide methods and apparatus for effective pneumatic transport of DRI and other relatively large iron-bearing particles which have a low capital cost and require less maintenance of the bins and related controls.

Other objects and advantages of the invention will be evident to those skilled in the art or will be described in this specification of the invention and appended drawings.

According to an aspect of the present invention, the objects thereof are achieved by providing a method and apparatus for pneumatically transporting friable particulate solid material at an advantageously low kinetic energy. The method and apparatus employ at least two control valves and corresponding regulators. The control valves regulate at least two control elements: a) the flow rate of gas recycled through the compressor of the carrier gas loop; and b) the amount of gas vented from the carrier gas loop. In certain advantageous embodiments, a third control valve and regulator control the amount of make-up carrier gas injected to the carrier gas loop. Contrary to the usual practice of increasing pressure to meet increased flow resistance in the transport pipe due to random flow variations (or even transient blockages), since the pressure at the point of DRI introduction to the pneumatic conveyor is required to be essentially the same as the reactor with which it is in open communication, applicants have uniquely discovered methods and systems which increase the pressure differential along the transport pipe by instead dropping the pressure at the discharge end of the transport pipe, but in a way that minimizes loss of carrier gas.

The invention in certain features relates the compressor discharge pressure level to the pressure at the bottom of a reduction reactor, because a pneumatic transport line for conveying particulate material from the reactor communicates directly and openly therewith. In the absence of any intermediate lock bins, the pressure at the beginning of the pneumatic transport line must be about the same as the pressure in the bottom of the reduction reactor. A control system according to certain features of the present invention is uniquely based on maintaining the kinetic energy of the carrier gas within predetermined limits adjacent the beginning of the transport line and not on the pressure difference of the carrier gas between the point of introduction of the iron-bearing particles and the point of discharge of said particles at a remote discharge point of the transport system, as is usually done in the prior art.

In accordance with an aspect of the present invention, a method is provided for controlling a pneumatic transport system for conveying friable particulate solid material through a transport pipe by means of a carrier gas circulating in a loop comprising said transport pipe and a carrier gas recycle conduit, the pneumatic transport system further including a carrier gas venting outlet pipe and means for moving said carrier gas through said carrier gas loop at a selectably variable flow rate, said transport pipe having a point of introduction of said material into said transport pipe and a remote point of discharge of said particulate material from said transport pipe. The method comprises the steps of determining a value of kinetic energy of said carrier gas at a location proximal to the point of introduction of said material into said transport pipe; comparing said first value of kinetic energy of said carrier gas with a first set point of kinetic energy to produce a first control signal; using said first control signal to control a first control valve located in said carrier gas venting outlet pipe; determining a value of flow rate of said carrier gas established by said moving means; comparing said value of flow rate with a comparison signal based on said first control signal to produce a second control signal; and using said second control signal for controlling selection of a flow rate at which the moving means moves the carrier gas through the carrier gas loop.

In accordance with a further aspect of the present invention, a control system for controlling a pneumatic transport system for conveying friable particulate solid material through a transport pipe by means of a carrier gas circulating in a loop comprising said transport pipe and a carrier gas recycle conduit, the pneumatic transport system further including a carrier gas venting outlet pipe and means for moving said carrier gas through said carrier gas loop at a selectably variable flow rate, said transport pipe having a point of introduction of said material into said transport pipe and a remote point of discharge of said particulate material from said transport pipe. The control system comprises: first measuring means for producing a first flow rate signal corresponding to a value of flow rate of said carrier gas downstream of said point of discharge of material from said transport pipe; second measuring means for producing a first pressure signal and a first temperature signal representing values of pressure and temperature of said carrier gas, respectively, proximal to said point of introduction of said material into said transport pipe; third measuring means for producing a second temperature signal, a second pressure signal and a second flow rate signal representing values of temperature, pressure and flow rate of said carrier gas, respectively, upstream of said point of introduction of material into said transport pipe; first control means for controllably venting carrier gas via said carrier gas venting outlet pipe based on the first flow rate signal, the first temperature signal and the first pressure signal; and second control means for selecting a carrier gas flow rate established by said moving means based on the first and second flow rate signals, the first and second temperature signals and the first and second pressure signals.

In accordance with still another aspect of the present invention a control system is provided for controlling a pneumatic transport system for conveying friable particulate solid material through a transport pipe by means of a carrier gas circulating in a loop comprising the transport pipe and a carrier gas recycle conduit, the pneumatic transport system further comprising means for venting carrier gas from the carrier gas loop under the control of a first control signal and means for moving the carrier gas through the carrier gas loop at a selectably variable flow rate in response to a second control signal, the transport pipe having a point of introduction of the solid material into the transport pipe and a remote point of discharge of the solid material from the transport pipe. The control system comprises: means for determining a value of kinetic energy of the carrier gas at a location proximal to the point of introduction of the solid material into the transport pipe; first control signal means for producing the first control signal by comparing the value of kinetic energy of the carrier gas with a set point of kinetic energy; means for determining a first value of flow rate of the carrier gas established by the moving means; and second control signal means for producing the second control signal by comparing the first value of flow rate with a comparison value based on the first control signal.

In accordance with a still further aspect of the present invention, a pneumatic transport system for conveying friable particulate solid material through a transport pipe by means of a carrier gas comprises: a transport pipe having a point of introduction of the solid material thereto and a remote point of discharge of the solid material therefrom; a carrier gas recycle conduit, the transport pipe and the carrier gas recycle conduit together providing a carrier gas circulating loop; carrier gas venting means for venting carrier gas from the carrier gas loop under the control of a first control signal; means for moving the carrier gas through the carrier gas loop at a selectably variable flow rate in response to a second control signal; means for determining a value of kinetic energy of the carrier gas at a location proximal to the point of introduction of the solid material into the transport pipe; first control signal means for producing the first control signal by comparing the value of the kinetic energy of the carrier gas with a set point of kinetic energy; means for determining a first value of flow rate of the carrier gas established by the moving means; and second control signal means for producing the second control signal by comparing the first value of flow rate with a comparison value based on the first control signal.

In accordance with yet still another aspect of the present invention, a method of operating a pneumatic transport system for conveying friable particulate solid material through a transport pipe by means of a carrier gas comprises the steps of: moving a carrier gas through a carrier gas circulating loop comprising a transport pipe and a carrier gas recycle conduit; introducing the solid material into the transport pipe at a point of introduction so that the solid material is entrained with the moving carrier gas to move therewith to a point of discharge from the transport pipe; discharging the solid material from the transport pipe at the point of discharge; determining a value of kinetic energy of the carrier gas at a location proximal to the point of introduction of the solid material into the transport pipe; producing a first control signal by comparing the value of the kinetic energy with a set point of kinetic energy; venting carrier gas from the carrier gas circulating loop under the control of the first control signal; determining a first value of flow rate of the carrier gas; producing a second control signal by comparing the first value of the flow rate with a comparison value based on the first control signal; and determining a flow rate of the carrier gas through the carrier gas circulating loop based on the second control signal.

BRIEF DESCRIPTION OF THE DRAWINGS

In this specification and in the accompanying drawings, some preferred embodiments of the invention are shown and described and various alternatives and modifications thereof have been suggested; but it is to be understood that these are not intended to be exhaustive and that many other changes and modifications can be made within the scope of the invention. The suggestions herein are selected and included for purposes of illustration in order that others skilled in the art will more fully understand the invention and the principles thereof and will thus be enabled to modify it in a variety of forms within the spirit and scope of the invention, each as may be best suited to the conditions of a particular use.

DETAILED DESCRIPTION OF CERTAIN ADVANTAGEOUS EMBODIMENTS

Figure 1:
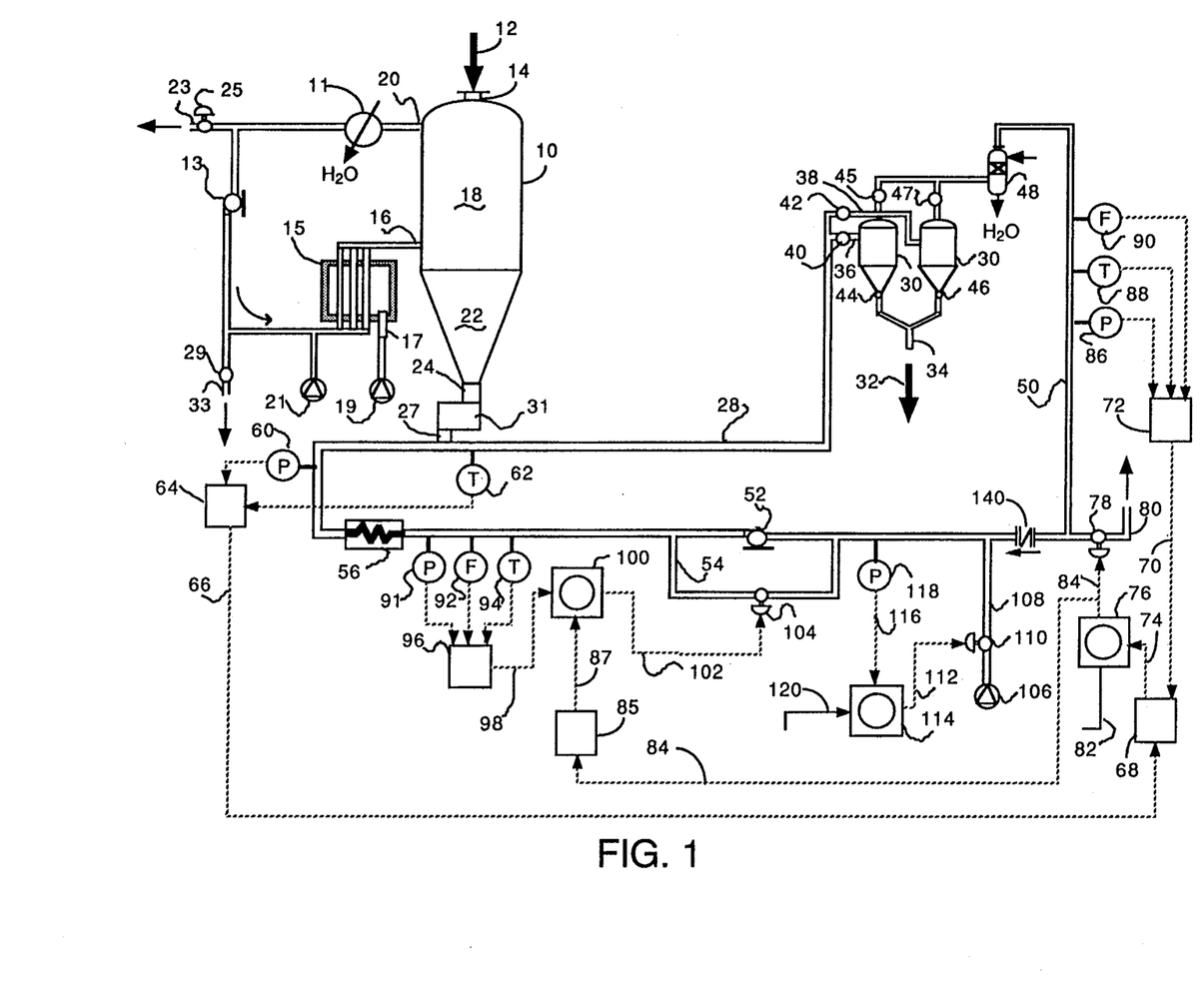
FIG. 1 is a schematic diagram of an advantageous embodiment of the present invention, wherein a control system is provided to control the pneumatic transport of DRI particles at high temperature.

With reference to FIG. 1, numeral 10 generally designates a direct reduction reactor to which iron ore 12 is fed through at least one inlet 14 in the form of lumps, pellets, or mixtures thereof preferably of a size about 80% of which is greater than 0.5 cm in diameter. The iron ore descends through the reactor 10 and is countercurrently contacted with a reducing gas at high temperature, normally in the range of 850° to 950° C., which reducing gas is introduced to the reactor at point 16 located in the lower part of the reduction zone 18, and is removed from the reactor through outlet 20 located in the upper part of the reduction zone. The reducing gas is recycled to the reactor 10 in a closed reducing gas loop comprising a cooler/cleaner 11 for such reducing gas and a gas compressor 13. The reducing gas is heated in a suitable gas heater 15 fired by a set of burners 17 fed with fuel from a source 19.

Reducing gas make up is injected into the reducing gas loop from a suitable source 21 or may be produced within the reducing gas loop in a gas reformer which may be incorporated in unit 15. In such case natural gas is added to the reducing gas from a source 21, in a manner already known in the art (see the Beggs, et al. U.S. Pat. No. 4,046,557). A purge outlet 23 is shown in the reducing gas loop for elimination of inerts from the reduction loop and for pressure control by means of valve 25. A $CO_2$ removal unit typically may be included in the reducing unit. Also a branch pipe 33 is shown downstream from the compressor 13, provided with valve 29 to indicate that a portion of this reducing gas can be used as carrier gas in the DRI transport loop (e.g., introduced to the loop at source 106).

At the lower part of reactor 10 there is a conical discharge section 22 which converges to at least one outlet 24 through which the already reduced ore or DRI is discharged. In many plants this lower zone 22 is used as a cooling zone for DRI, in order to cool it down to ambient temperature to avoid reoxidation problems when handled in contact with the atmosphere. In order to cool down DRI, normally a cooling gas stream is circulated countercurrently to the DRI, which gas is introduced at the lower part of the cooling zone of the reduction reactor, and is removed hot at the upper part thereof. Both the reducing gas and the cooling gas are recycled to the reactor as is well known in the art. When it is desired to discharge the DRI at high temperature, the cooling gas loop is not used and DRI is discharged hot.

DRI is discharged from the reduction reactor at a rate regulated by a device 24, which may be a rotary or star valve, for example as described in U.S. Pat. Nos. 4,427,135 and 4,427,136, or may be other devices of the type described in U.S. Pat. Nos. 3,375,099; 2,670,946; 4,129,289 and 4,032,120. DRI is then introduced to pneumatic conveying pipe 28 at a point 27, which may or may not be isolated from the pressure of reactor 10 by means of an intermediate lockhopper 31 or a similar device. In certain advantageous embodiments of the present invention there is a direct open connection between the reactor 10 and the pipe 28 via device 24.

A carrier gas stream is caused to circulate through transport pipe 28 for pneumatically conveying the DRI particles from the point of introduction 27 to a remote point of discharge 34. The DRI particles 32 are disengaged from the carrier gas and discharged from bins 30 through discharge 34 for further processing (such as in an electric arc furnace).

Transport pipe 28, prior to connecting to bins 30, bifurcates into pipes 36 and 38, each provided with a respective valve 40 and 42. Similarly, bins 30 are provided with respective valves 44 and 46 at the bottom for the purpose of alternately isolating each bin from the conveying line and from the outer atmosphere. While one of the bins is receiving material transported through pipe 28, the other bin is discharging material to the outer atmosphere, and vice versa. With this cyclical operation a continuous transport can be achieved, even if the bins are being filled and discharged batchwise.

The carrier gas, after disengagement from the DRI particles in bins 30 is cooled down and washed to remove dust and fines in a manner known in the art. This normally is done by washing the gas with water in a packed vessel 48. To this end the carrier gas flows through pipes connecting said bins 30 with vessel 48 provided with valves 45 and 47 to permit the cyclically alternate operation of the bins 30.

After being cooled and cleaned, the carrier gas flows through pipe 50 and a check valve 140 to a compressor 52 provided with by-pass pipe 54, then to carrier gas heater 56 and finally the carrier gas reaches the point of introduction 27 of hot DRI thus forming the closed carrier gas loop. In the present embodiment, the compressor 52 has a fixed speed motor, but in other embodiments, a variable rate compressor having a variable speed motor is instead used. In the present embodiment, compressor 52 is preferably a reciprocating or screw-type compressor. The carrier gas heater 56 is provided for avoiding heat losses from the DRI (produced at high temperature in the reduction reactor 10) for its subsequent utilization at high temperature, for example in an electric arc furnace or in hot briquetting. However, if the DRI is to be discharged cold from reactor 10, then heater 56 is not necessary.

In general the basic control system of the invention, comprises two regulators connected in a cascade mode so that one of them responds faster than the other to variations of the kinetic energy of the carrier gas measured at the point of introduction 27. This manner of operation serves to minimize venting of carrier gas from the loop, the venting regulator 76 having the slower response and thereby acting as a back-up means for increasing the kinetic energy of the carrier gas.

The control system in accordance with one aspect of the invention serves to maintain the kinetic energy of the carrier gas, e.g. $\frac{1}{2}$ (density $\times$ velocity$^2$) evaluated at a point proximal to the point of introduction 27 of solid particles into pipe 28, at a predetermined value so that the solid particles are moved by the gas while at the same time limiting the velocity of such particles to minimize breakage thereof and the consequent fines generation.

In order to measure the kinetic energy of the carrier gas at a first location proximal to the point of introduction of DRI 27 into transport pipe 28, corresponding measurement signals produced by pressure sensor 86, temperature sensor 88 and flow rate sensor 90 are supplied to a flow rate signal generator 72 which produces a flow rate signal 70 based thereon indicative of the flow rate of the carrier gas exiting from cooling and cleaning unit 48 evaluated at normal gas flow conditions. Signal 70 is then supplied to a kinetic energy signal generator 68 which produces a kinetic energy signal 74 indicative of the kinetic energy of the carrier gas at location 27. Generator 68 corrects the values of kinetic energy based on the pressure and temperature signals from sensors 60 and 62 so that the kinetic energy signal 74 reflects standardized conditions at point 27. For this purpose, actual pressure and temperature of the carrier gas are measured by the pressure sensor 60 and temperature sensor 62, and corresponding measurement signals are supplied thereby to a correction signal generator 64 which produces a correction signal 66 proportional to the ratio of temperature to pressure measured by sensors 62 and 60. The correction signal 66 is then supplied to the generator 68 in order to produce a corrected kinetic energy signal 74. The temperature of carrier gas at the point of introduction of solid particles 27, measured by sensor 62, is determined by measuring the external temperature of pipe 28. The wall temperature of pipe 28 must be compensated in order to estimate the temperature of the gas inside the pipe. This is a practical way of measuring such temperature since the solid particles as they are transported would rapidly erode any sensor inserted into the pipe which is in direct contact with the gas and solids mixture. The compensation needed to estimate the actual temperature of the carrier gas can be determined by empirical measurements while conveying solid particles at several temperature levels at a constant solids flow rate.

Controller 76 receives the signal 74 indicative of the value of kinetic energy of the carrier gas at point 27 and compares it with a first set point 82 fed by an operator to controller 76 to produce a valve control signal 84 for controlling the state of a valve 78 from 0% open to 100% open to controllably vent gas from the loop through a vent pipe 80.

Controller 76 produces the valve control signal 84(CS84) in accordance with the following relationship:

$$CS84 = PB_1 \left( (SP_1 - PV_1) + \frac{1}{T_1} \int (SP_1 - PV_1) dt \right) \quad (1)$$

wherein SP₁ represents the first set point value 82, PV₁ represents the kinetic energy signal 74, and PB₁ and T₁ are a proportional band constant and an integral time constant, respectively, which are selected according to the characteristics of the pneumatic transport system. Constants PB₁ and T₁ are selected in accordance with the Ziegler-Nichols procedure to maintain the valve 78 closed under nearly all conditions, whether transporting material in the dilute or dense phase. For example, the constants may be selected such that valve 78 opens to create a sufficient pressure drop to clear a blockage in line 28 but is otherwise closed. This reduces the consumption of transporting gas which is expensive to supply. Set point 82 preferably is selected as a low value of the kinetic energy of the carrier gas in the neighborhood of the minimum pressure drop across the particle transport path from introduction to discharge. The set point 82 is determined for each system empirically but is essentially independent of the type of carrier gas and its temperature. By tying the kinetic energy to such minimum value, the velocity of the entrained particles is likewise minimized, thus to minimize the undesirable breakup of the particles. The selection of the set point 82 also determines the suction pressure of compressor 52 in order to match the pressure of the carrier gas in the transport pipe at point 27 with that inside the reactor 10.

Typically, set point 82 is determined for a given plant at the time that it is commissioned. Thus, in the disclosed embodiments, a solids flow rate for the plant's pneumatic transport system is first selected. For a typical commercial sponge iron plant, a representative solids flow rate is about 70 tons/hour. Then a profile of total pressure drop as a function of kinetic energy is obtained empirically at the predetermined constant solid flow rate during pneumatic transport of the material to be conveyed at the plant. The kinetic energy is represented by the kinetic energy signal 74. The total pressure drop is measured as the difference between (a) the pressure at the point of solids introduction 27, and (b) the pressure at the bins 30 (for example, at valve 40 or 42). The resulting profile is then examined (e.g., by plotting over a range of values of ΔP vs. kinetic energy) in order to select a point of operation at which an advantageously low value of kinetic energy is achieved while preferably maintaining the total pressure drop at as close to the minimum ΔP value as is practical.

The total pressure drop (plus other pressure losses such as those due to pipes, fittings and gas cleaning unit(s)) determines the capacity of the compressor which is required to operate the plant's pneumatic transport system, bearing in mind that due to variations in operating conditions (for example, intermittent solids blockages in the pneumatic transport line), it will be necessary to provide a compressor having a somewhat greater capacity than the minimum total pressure drop at the otherwise preferred operating point. By reducing the necessary capacity of the compressor, its capital cost (which is a significant proportion of the transport system's cost) and especially the significant electrical costs incurred to power the compressor, are advantageously reduced. By selecting the desired operating point based on the profile of total pressure drop to kinetic energy, the set point 82 for the plant is thereby selected.

The control signal 84 also is used to produce a second set point 87. For this purpose signal 84 is supplied to a flow rate signal generator 85 to transform signal 84 to a signal indicative of flow rate, making it in this way comparable with a flow rate signal 98. More specifically, generator 85 produces the second set point 87 (SP87) in accordance with the following relationship:

$$SP87 = SP_c(k_1 + k_2 * CS84) \quad (2)$$

wherein CS84 is the control signal 84 produced by the controller 76, $k_1$ and $k_2$ are constants selected empirically at values close normal conditions, and $SP_c$ is a flow rate signal which is (1) to 1 in order to avoid venting of carrier gas by valve 78 under equal to the flow rate signal 70, when CS84 is greater than 80%, or (2) equal to the flow rate signal 70 multiplied by the square root of the ratio of set point 82 to the kinetic energy signal 74, when CS84 is less than or equal to 80%. Other methods for transforming signal 84 to a flow rate signal will be readily apparent. For example, the 80% comparison value used in the above example, may be replaced by other suitable values.

Signal 98, indicative of the actual flow rate of carrier gas circulating through the transport pipe 28, is produced by a flow rate signal generator 96 based on a pressure signal produced by a pressure sensor 91, a flow rate signal produced by a flow rate sensor 92 and a temperature signal produced by a temperature sensor 94. Signal 98 is then compared with second set point 87 by a second controller 100 so that a valve control signal 102 is produced to drive a recycle valve 104 which regulates the amount of carrier gas flowing through by-pass pipe 54, and thus the net amount of carrier gas passing beyond compressor 52 towards point 27. The compressor 52 in this embodiment is operated as a constant rate gas flow source with a high net flow output achieved when valve 104 is fully closed and a low net flow output achieved when valve 104 is fully open (thus increasing the output flow in pipe 54 and consequently decreasing the flow into pipe 28). In certain other embodiments, compressor 52 may be replaced by a compressor having a variable speed motor which is controlled directly by a suitable control signal produced in the same manner as control signal 102.

The second controller 100 controls the gas mass flow in the system, controlling the state of the recycle valve 104 in such a manner that the compressor 52 behaves as a gas flow source analogous to an electric current source. The pressure generated by the compressor 52 is then adjusted to that necessary to sustain the required gas flow rate without exceeding the value of the pressure in reactor 10. More specifically, the controller 100 produces the valve control signal 102 (CS102) in accordance with the following relationship:

$$CS102 = PB_2\left((SP_2 - PV_2) + \frac{1}{T_2}\int(SP_2 - PV_2)dt\right) \quad (3)$$

wherein SP₂ represents the second set point 87, PV₂ represents the flow rate signal 98, and PB₂ and T₂ are a proportional band constant and an integral time constant, respectively, which are selected during initial plant commissioning so that the response of valve 104 leads that of venting valve 78. That is, CS102 provides a faster response than CS84 (valve control signal 84). Consequently, operation of valve 104 normally achieves the desired operational conditions, thus avoiding the need to also operate valve 78 (in order to avoid venting expensive carrier gas).

When valve 78 is opened due to flow perturbations in the transport line 28, and consequently, as part of restabilization make-up carrier gas has to be injected to the carrier gas loop, then a third controller 114 preferably is provided to actuate a valve 110, which regulates the amount of carrier gas injected from a suitable source 106 through a pipe 108 to the transport loop. Valve 110 is driven by a valve control signal 112, produced by controller 114 in response to a comparison of a pressure signal 116 supplied by a pressure sensor 118 (representing pressure upstream of the compressor 52), to a third set point 120 which represents a lower limit of pressure allowable at the suction side of compressor 52. More specifically, like controllers 76 and 100, controller 114 processes the difference between pressure signal 116 and third set point 120 according to a proportional and integral function to derive the valve control signal 112. The third set point 120 is selected in order to maintain a minimum pressure in pipe 28 as required to ensure an adequate flow of the carrier gas in order to transfer the solid particles in the dense phase. The proportional band constant and the integral time constant are selected empirically in order to provide a slower response by controller 114 than by either controller 100 or controller 76, while providing a sufficiently fast response to inject make-up carrier gas so that the compressor will not be damaged as a result of insufficient gas pressure at its suction side. In certain embodiments, the valve 110 is operated manually, so that controller 114 then is not required.

Linking the value of the kinetic energy to the set point of the regulator 100 of mass flow of carrier gas, makes it possible to provide a "vernier" correction upon the main set point 82. As a result, the venting valve 78 is almost always closed, even during the most adverse conditions of dense phase operation. This is a very valuable feature of the invention, because the carrier gas, be it reducing gas or an inert gas, has a production cost, so that avoiding venting of the system lowers operation costs.

In the event of a very high pressure drop along the transport pipe 28, which situation can occur particularly during dense phase operation, the pressure level at the suction side of the compressor 52 can decrease to an unacceptably low level. In order to protect the compressor 52 in such an event, a fourth regulator is incorporated in a further embodiment of a control system according to the invention which is shown in FIG. 2.

Figure 2:
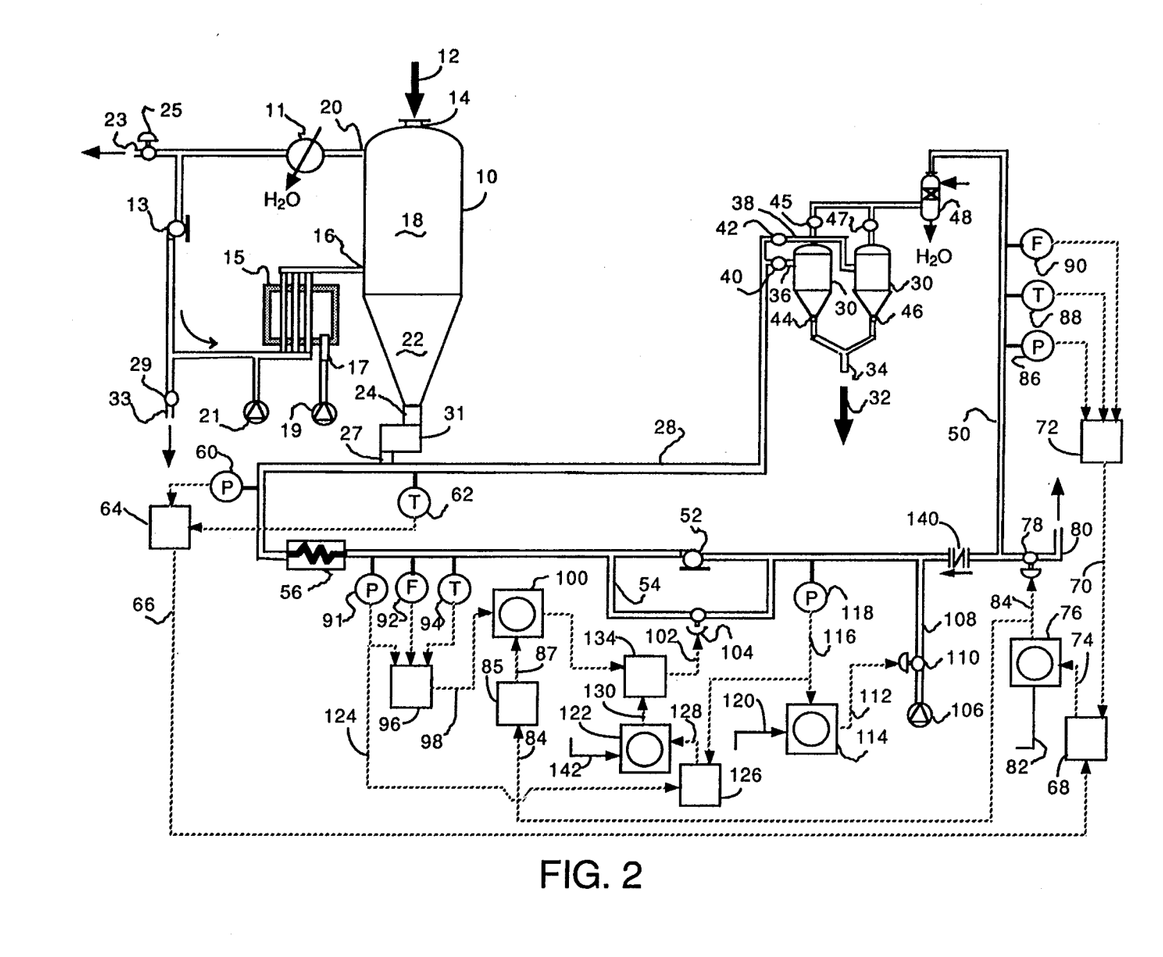
FIG. 2 is schematic diagram of another embodiment of the present invention employing a control system wherein an additional regulator is added to protect the carrier gas compressor against low pressure differentials between its suction side and its discharge side.

Referring to FIG. 2, where elements corresponding to the elements of FIG. 1 are designated with the same reference numerals, the pressure signal 116 which represents pressure at the suction side of the compressor 52 and a pressure signal 124 produced by the pressure sensor 91 representing pressure at the discharge side of the compressor 52 are supplied to a difference signal generator 126 which produces a difference signal 128 representing the difference between pressure signals 124 and 116. The signal 128 is supplied to a further controller 122 which, similarly to controllers 76 and 100, carries out a proportional and integral control function of the difference between a set point signal 142 and the pressure difference signal 128 to produce a valve control signal 130. The valve signal 130 is compared by a selector 134 to the valve control signal produced by the controller 100, and then the selector 134 selects the signal which would open valve 104 to a greater extent as the control signal 102. That is, when the signal 130 is greater, it is selected in place of the output of controller 100 to be applied to the valve 104 so that the compressor 52 is protected against very high pressure differentials. Accordingly, the set point signal 142 is set at a level higher than the levels of pressure difference signal 128 encountered in normal operation, but sufficiently low so that if a condition should occur (such as a blockage in one of the pipes) which leads to a higher than normal pressure difference across compressor 52, controller 122 responds by applying the control signal 130 at a level which overrides the output of controller 100 to protect compressor 52. As a result, the set point 142 should be selected to be slightly above the value of pressure at reactor 10, because pressure at the suction side of compressor 52 cannot be less than zero. The proportional band constant and integral time constant used by controller 122 are selected to provide a sufficiently rapid response in the event of an abnormal pressure difference across compressor 52.

From the foregoing description it should be evident that the control systems and methods according to the present invention are capable of providing the several advantages outlined above. The controller 100 controlling the amount of carrier gas circulating through the compressor, and consequently through the transport pipe 28, responds faster than controller 76 which controls the venting of carrier gas from the carrier gas loop. This feature makes it possible to make the adjustments needed to meet load variations and yet minimize carrier gas losses and consequently to economize in operation costs.

Another important feature of the invention is that the control system maintains the kinetic energy of the carrier gas adjacent the introduction of the solid particles to the transport line at a desirably low level so that, since the velocity of the gas is the main factor in determining its kinetic energy, its velocity is kept at a desirably low level to minimize the production of fines from particles entrained in the gas.

It is of course to be understood that the foregoing description is intended to be illustrative only and that numerous changes can be made in the specific embodiments disclosed without departing from the spirit of the invention as defined in the appended claims. It will be appreciated that the operations carried out by the various controllers, selectors, comparators and generators of the disclosed embodiments, as well as equivalents thereof, can be combined in one or more signal processing devices, and that a single processor (or several parallel processors) can be employed to carry out all such signal generation and control operations. Moreover, either or both of programmable and hardwired digital processors, as well as analog devices, can be employed to carry out these operations.

What is claimed is:

1. A method for controlling a pneumatic transport system for conveying friable particulate solid material through a transport pipe by means of a carrier gas circulating in a loop comprising said transport pipe and a carrier gas recycle conduit, the pneumatic transport system further including a carrier gas venting outlet pipe and means for moving said carrier gas through said carrier gas loop at a selectably variable flow rate, said transport pipe having a point of introduction of said material into said transport pipe and a remote point of discharge of said particulate material from said transport pipe; said method comprising: determining a value of kinetic energy of said carrier gas at a location proximal to the point of introduction of said material into said transport pipe; comparing said first value of kinetic energy of said carrier gas with a first set point of kinetic energy to produce a first control signal; using said first control signal to control a first control valve located in said carrier gas venting outlet pipe; determining a value of flow rate of said carrier gas established by said moving means; comparing said value of flow rate with a comparison signal based on said first control signal to produce a second control signal; and using said second control signal for controlling selection of a flow rate at which the moving means moves the carrier gas through the carrier gas loop.

2. The method of claim 1, wherein the step of determining the value of kinetic energy comprises determining a first kinetic energy value of the carrier gas at a location downstream of the point of discharge and modifying the first kinetic energy value based on pressure and temperature of the carrier gas proximal to the point of introduction of the material to produce the value of kinetic energy.

3. The method of claim 1, wherein the step of using the second control signal for controlling selection of the flow rate comprises bypassing a gas compressor of the moving means under the control of the second control signal.

4. The method of claim 1, wherein the step of using the second control signal for controlling selection of the flow rate comprises applying the second control signal to a variable rate compressor for controlling an operating rate thereof.

5. The method of claim 1, further comprising the steps of determining a first value of carrier gas pressure at a location between the point of discharge and the moving means, comparing the first value of carrier gas pressure with a make-up gas control set point to produce a third control signal, and using the third control signal to controllably add carrier gas as make-up to the carrier gas loop.

6. The method of claim 1, further comprising the steps of determining a first value of carrier gas pressure at a location downstream of the moving means, determining a second value of carrier gas pressure at a location upstream of the moving means, and comparing the first and second values of carrier gas pressure, and wherein the step of producing the second control signal comprises producing the second control signal based on the comparison of the first and second values of carrier gas pressure.

7. A control system for controlling a pneumatic transport system for conveying friable particulate solid material through a transport pipe by means of a carrier gas circulating in a loop comprising said transport pipe and a carrier gas recycle conduit, the pneumatic transport system further including a carrier gas venting outlet pipe and means for moving said carrier gas through said carrier gas loop at a selectably variable flow rate, said transport pipe having a point of introduction of said material into said transport pipe and a remote point of discharge of said particulate material from said transport pipe; said control system comprising:

first measuring means for producing a first flow rate signal corresponding to a value of flow rate of said carrier gas downstream of said point of discharge of material from said transport pipe;

second measuring means for producing a first pressure signal and a first temperature signal representing values of pressure and temperature of said carrier gas, respectively, proximal to said point of introduction of said material into said transport pipe;

third measuring means for producing a second temperature signal, a second pressure signal and a second flow rate signal representing values of temperature, pressure and flow rate of said carrier gas, respectively, upstream of said point of introduction of material into said transport pipe;

first control means for controllably venting carrier gas via said carrier gas venting outlet pipe based on the first flow rate signal, the first temperature signal and the first pressure signal; and second control means for selecting a carrier gas flow rate established by said moving means based on the first and second flow rate signals, the first and second temperature signals and the first and second pressure signals.

8. The control system of claim 7, wherein the first measuring means is operative to produce said first flow rate signal as a kinetic energy equivalent signal based on measured flow rate, temperature and pressure values downstream of said point of discharge.

9. The control system of claim 8, wherein the first measuring means is operative to produce a signal representing kinetic energy of the carrier gas at the point of introduction based on the kinetic energy equivalent signal, the first pressure signal and the first temperature signal, and the second control means is operative to select the carrier gas flow rate based on the signal representing kinetic energy at the point of introduction, 10. The control system of claim 7, further comprising fourth measuring means for producing a third pressure signal representing a value of pressure upstream of the moving means and comparison means for comparing the second and third pressure signals to produce a pressure comparison signal, and wherein the second control means is operative to select the carrier gas flow rate based on the pressure comparison signal.

11. The control system of claim 7, further comprising fourth measuring means for producing a third pressure signal representing a value of pressure upstream of the moving means, and means for controllably adding carrier gas as make-up to the carrier gas loop based on the third pressure signal.

12. A control system for controlling a pneumatic transport system for conveying friable particulate solid material through a transport pipe by means of a carrier gas circulating in a loop comprising the transport pipe and a carrier gas recycle conduit, the pneumatic transport system further comprising means for venting carrier gas from the carrier gas loop under the control of a first control signal and means for moving the carrier gas through the carrier gas loop at a selectably variable flow rate in response to a second control signal, the transport pipe having a point of introduction of the solid material into the transport pipe and a remote point of discharge of the solid material from the transport pipe, the control system comprising:

means for determining a value of kinetic energy of the carrier gas at a location proximal to the point of introduction of the solid material into the transport pipe;

first control signal means for producing the first control signal by comparing the value of kinetic energy of the carrier gas with a set point of kinetic energy;

means for determining a first value of flow rate of the carrier gas established by the moving means; and second control signal means for producing the second control signal by comparing the first value of flow rate with a comparison value based on the first control signal.

13. The control system of claim 12, wherein the first control signal means has a first response time for producing the first control signal and the second control signal means has a second response time for producing the second control signal, the second response time being shorter than the first response time.

14. The control system of claim 12, wherein the means for determining a value of kinetic energy is operative to determine a first kinetic energy value of the carrier gas at a location downstream of the point of discharge and modifying the first kinetic energy value based on pressure and temperature of the carrier gas proximal to the point of introduction of the material to produce the value of kinetic energy.

15. The control system of claim 12, further comprising means for determining a first value of carrier gas pressure at a location between the point of discharge and the moving means, means for comparing the first value of carrier gas pressure with a make-up gas control set point to produce a third control signal, and means for controllably adding carrier gas as make-up to the carrier gas loop.

16. The control system of claim 12, further comprising means for determining a first value of carrier gas pressure at a location downstream of the moving means, means for determining a second value of carrier gas pressure at a location upstream of the moving means, and means for comparing the first and second values of carrier gas pressure, and wherein the second control signal means is operative to produce the second control signal based on the comparison of the first and second values of carrier gas pressure.

17. A pneumatic transport system for conveying friable particulate solid material through a transport pipe by means by a carrier gas comprising:
a transport pipe having a point of introduction of the solid material thereto and a remote point of discharge of the solid material therefrom;
a carrier gas recycle conduit, the transport pipe and the carrier gas recycle conduit together providing a carrier gas circulating loop;
carrier gas venting means for venting carrier gas from the carrier gas loop under the control of a first control signal;
means for moving the carrier gas through the carrier gas loop at a selectably variable flow rate in response to a second control signal;
means for determining a value of kinetic energy of the carrier gas at a location proximal to the point of introduction of the solid material into the transport pipe;
first control signal means for producing the first control signal by comparing the value of the kinetic energy of the carrier gas with a set point of kinetic energy;
means for determining a first value of flow rate of the carrier gas established by the moving means; and
second control signal means for producing the second control signal by comparing the first value of flow rate with a comparison value based on the first control signal.

18. A method of operating a pneumatic transport system for conveying friable particulate solid material through a transport pipe by means of a carrier gas comprising the steps of:
moving a carrier gas through a carrier gas circulating loop comprising a transport pipe and a carrier gas recycle conduit;
introducing the solid material into the transport pipe at a point of introduction so that the solid material is entrained with the moving carrier gas to move therewith to a point of discharge from the transport pipe;
discharging the solid material from the transport pipe at the point of discharge;
determining a value of kinetic energy of the carrier gas at a location proximal to the point of introduction of the solid material into the transport pipe;
producing a first control signal by comparing the value of the kinetic energy with a set point of kinetic energy;
venting carrier gas from the carrier gas circulating loop under the control of the first control signal;
determining a first value of flow rate of the carrier gas;
producing a second control signal by comparing the first value of the flow rate with a comparison value based on the first control signal; and
determining a flow rate of the carrier gas through the carrier gas circulating loop based on the second control signal.

* * * * *